United States Patent [19]

Inoue

[11] 4,367,129

[45] Jan. 4, 1983

[54] WIRE-ELECTROEROSION METHOD AND APPARATUS FOR FORMING A TAPERED CONTOUR IN A WORKPIECE

[75] Inventor: Kiyoshi Inoue, Tokyo, Japan

[73] Assignee: Inoue-Japax Research Incorporated, Yokohama, Japan

[21] Appl. No.: 273,051

[22] Filed: Jun. 12, 1981

[51] Int. Cl.³ .................. C25F 3/00; C25F 5/00; B23P 1/02; B23P 1/12

[52] U.S. Cl. .................. 204/129.55; 204/129.6; 204/224 M; 219/69 W; 219/69 D

[58] Field of Search .............. 204/129.5, 129.6, 129.7, 204/225, 206, 224 M, 129.55; 219/69 W, 69 D

[56] References Cited

U.S. PATENT DOCUMENTS

| | | | |
|---|---|---|---|
| 2,974,216 | 3/1961 | Inoue | 219/69 W |
| 3,929,163 | 12/1975 | Ullmann et al. | 204/206 |
| 4,263,116 | 4/1981 | Inoue | 204/224 M |
| 4,317,019 | 2/1982 | Itoh | 204/129.1 X |

FOREIGN PATENT DOCUMENTS 52-14998  4/1977  Japan .................. 204/129.1

*Primary Examiner*—G. L. Kaplan
*Assistant Examiner*—N. Nguyen

*Attorney, Agent, or Firm*—Karl F. Ross

[57] ABSTRACT

The workpiece is partially immersed in a first electroerosion-machining liquid so that the surface of the liquid is positioned at a predetermined height from the lower surface of the workpiece. A wire electrode is passed vertically through the workpiece to define a machining gap therebetween which extends across the entire thickness of the workpiece including an upper portion and a lower portion divided from each other by the liquid surface of the first electroerosion-machining liquid. A second electroerosion-machining liquid having a specific resistivity greater than that of the first is supplied from above the workpiece into the machining gap along the upper portion and then allowed to diffuse into the machining gap along the lower portion. Electroerosive material removal from the workpiece occurs along the upper portion uniformly at a first rate and along the lower portion at a varying second rate which is not less than the first rate and which increases as the distance from the liquid level is increased. By relatively displacing the wire electrode and the workpiece in the horizontal plane, a contour having a non-tapered and tapered sections stepped in the direction of thickness of the workpiece is thus generated in the workpiece.

5 Claims, 4 Drawing Figures

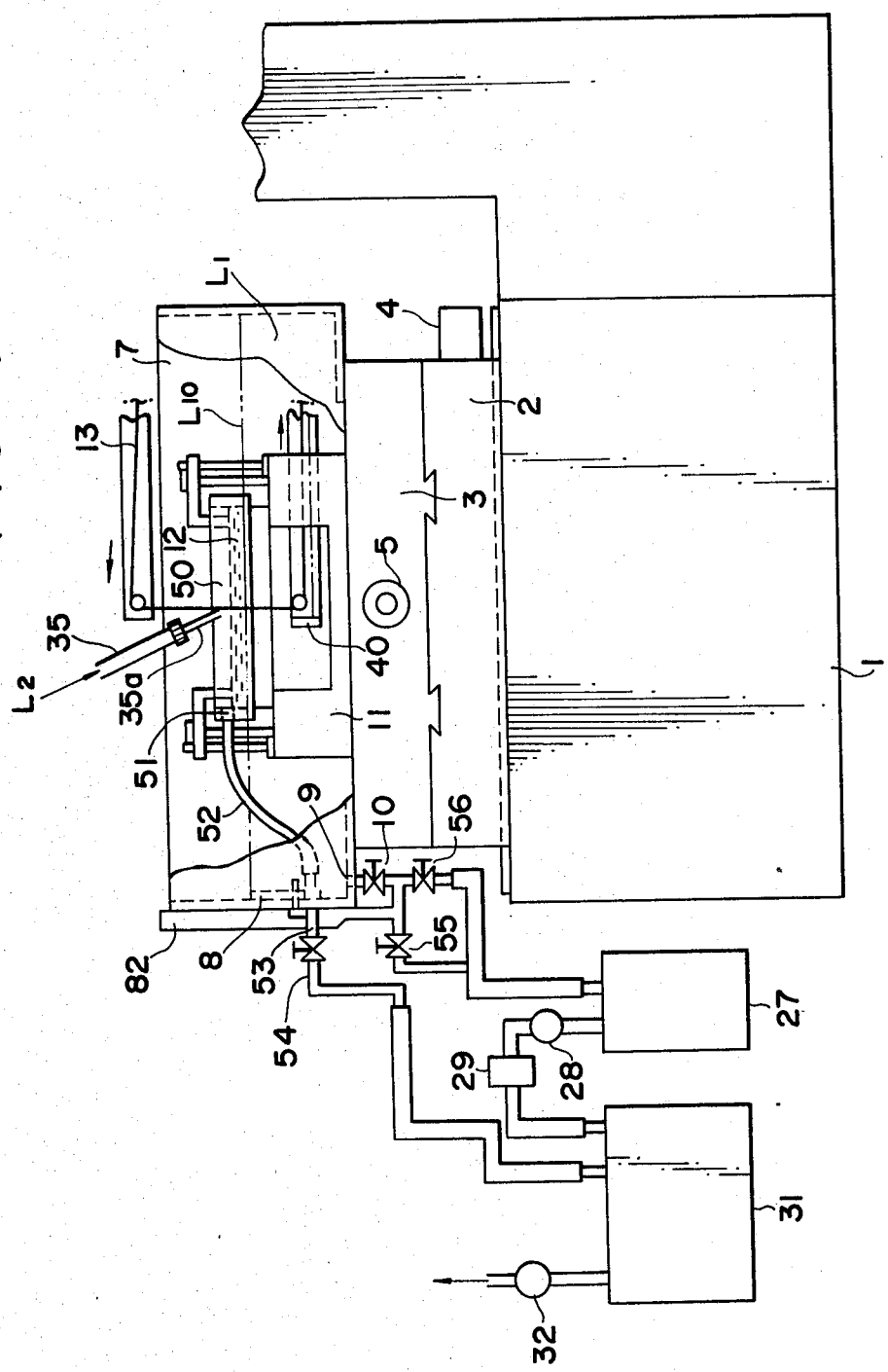

WIRE-ELECTROEROSION METHOD AND APPARATUS FOR FORMING A TAPERED CONTOUR IN A WORKPIECE

FIELD OF THE INVENTION

The present invention relates generally to the wire-electroerosion machining of a tapered contour in a workpiece and, more particularly to an improved wire-electroerosion method of and apparatus for forming a workpiece with a contour having a non-tapered and tapered portions stepped in the direction of thickness of the workpiece.

BACKGROUND OF THE INVENTION

The wire-electroerosion machining process commonly makes use of an extremely thin tool electrode in the form of a continuous metallic wire of a diameter of 0.02 to 0.3 mm. The wire electrode is vertically passed through a workpiece to define an electroerosion machining gap between them and is axially driven continuously from a supply to a takeup via the machining gap which extends across the thickness of the workpiece. The workpiece is securely mounted in a work receptacle filled with air or open to the atmosphere and typically lies perpendicular to the axis of the traveling wire electrode. A liquid machining medium, e.g. distilled water, is supplied to flood over the region of the wire electrode and the machining gap in the workpiece while a machining electric current is passed between the wire electrode and the workpiece to produce electroerosive material removal from the latter. As material removal proceeds, the receptacle and the wire electrode are relatively displaced, typically perpendicular to the axis of the traveling wire electrode along a prescribed cutting path such that a desired contour is formed in the workpiece. The machining liquid flooding over the cutting region is allowed to fall by gravity on the floor of the work receptacle and then led from the latter to a liquid filtering and circulation system for recycling to the liquid delivery nozzle.

It has generally been accepted that the wire-electroerosion process is highly suitable for machining plastic molds, pressing dies and various other shaped products in due precision and with efficiency. Problems arise, however, when the process is required to form a tapered contour in a workpiece and especially to form the workpiece with a contour having a non-tapered and tapered portions stepped in the direction of the workpiece thickness. Such requirements arise, for example, in a die which should include a straight cutting edge and a tapered relief section. The practice which has been followed heretofore to meet these requirements generally is to use a two-step machining procedure. Thus, in the first step the tapered section is machined with sinking-type electroerosion machine or with a traditional milling and/or grinding machines and in the second step the non-tapered cutting edge section is machined with a wire-electroerosion machine. This procedure is complex, time-consuming and costly. The tapered edge portion has also been machined, in one of the first or second steps, with a modified wire-electroerosion machine which incorporates special facilities to allow the wire electrode to be inclined at an angle with respect to the workpiece surfaces. Although this procedure permits two-step operations with the single equipment, those special facilities entail relatively complex three-axis or four-axis control programming and accordingly adds to further substantial cost and labour. Furthermore, the two-step operation doubles the machining time and is undesirably time-consuming and hence inefficient.

OBJECTS OF THE INVENTION

It is, accordingly, an important object of the present invention to provide an improved wire-electroerosion method of forming a tapered contour in a workpiece.

Another important object of the invention is to provide a wire-electroerosion method of forming a workpiece with a contour having a non-tapered and tapered portions stepped in the direction of the workpiece thickness, which method is extremely efficient and allows such a contour to be machined in a single step.

A further important object of the invention is to provide an apparatus for forming a workpiece with a tapered contour, especially a contour having a non-tapered and tapered portions stepped in the direction of thickness of the workpiece, which apparatus is relatively simple and extremely efficient and requires no expensive and sophisticated facility which has hitherto been essential for forming a tapered contour by the wire-electroerosion process.

SUMMARY OF THE INVENTION

In accordance with the present invention there is provided, in a first aspect thereof, a wire-electroerosion method of forming a workpiece with a contour having a non-tapered and tapered portions stepped in the direction of thickness of the workpiece, the method comprising the steps of: disposing the workpiece in a worktank containing a first electroerosion-machining liquid so that the workpiece is partially immersed therein to a preselected height from the lower surface of the workpiece with the liquid surface level extending in a horizontal plane dividing the workpiece into a non-immersed portion and an immersed portion; passing a continuous wire electrode vertically through the workpiece to define therebetween an elongate machining gap extending across the non-immersed upper and immersed lower portions, and axially displacing the wire electrode from a supply means to a collection means through the machining gap; supplying from above the workpiece, a stream of a second electroerosion-machining liquid having a specific resistivity greater than that of the first liquid into the machining gap in the non-immersed upper portion and permitting the stream at least partially to diffuse into the machining gap in the immersed lower portion of the workpiece while applying a machining electric current between the wire electrode and the workpiece whereby electroerosive material removal from the workpiece occurs across the machining gap along the upper portion uniformly at a first rate and along the lower portion at a rate which is not less than the first rate and which increases as the distance from the horizontal plane is increased; maintaining the surface level of the liquid in the worktank substantially constant; maintaining the specific resistivity of the liquid in the worktank substantially constant; and relatively displacing the wire electrode and the workpiece orthogonally to the axis of the wire electrode along a predetermined path.

The invention also provides, in a second aspect thereof, a wire-electroerosion apparatus for forming a workpiece with a contour having a non-tapered and tapered portions stepped in the direction of thickness of the workpiece, the apparatus comprising: a worktank for containing a first electroerosion-machining liquid and receiving a workpiece therein in such a manner that it is partially immersed in the liquid to a preselected height from the lower surface thereof with the liquid surface level extending in an horizontal plane dividing the workpiece into a non-immersed portion and an immersed portion; means for guiding a continuous wire electrode to pass vertically through the workpiece, thereby defining therebetween an elongate machining gap extending across the non-immersed upper and immersed lower portions; means for axially displacing the wire electrode from a supply means to a collection means through the machining gap; nozzle means disposed above the workpiece for supplying a stream of a second electroerosion-machining liquid having a specific resistivity greater than that of the first liquid into the machining gap in the non-immersed portion and permitting the stream at least partially to diffuse into the machining gap in the immersed portion of the workpiece; a power supply for applying a machining electric current between the wire electrode and the workpiece to produce electroerosive material removal from the workpiece across the elongate machining gap whereby the material removal occurs along the upper portion uniformly at a first rate and along the lower portion at a second rate which is not less than the first rate and which increases as the distance from the horizontal plane is increased; means for maintaining the surface level of the liquid in the worktank substantially constant; means for maintaining the specific resistivity of the liquid in the worktank substantially constant; and machining feed drive means for relatively displacing the wire electrode and the workpiece orthogonally to the axis of the wire electrode along a predetermined path.

BRIEF DESCRIPTION OF THE DRAWING

These and other objects and features of the invention as well as advantages thereof will become more readily apparent from the following description taken with reference to the accompanying drawing in which:

FIG. 4 is a similar view to that of FIG. 1, diagrammatically illustrating another apparatus according to the invention.

SPECIFIC DESCRIPTION

Figure 1:
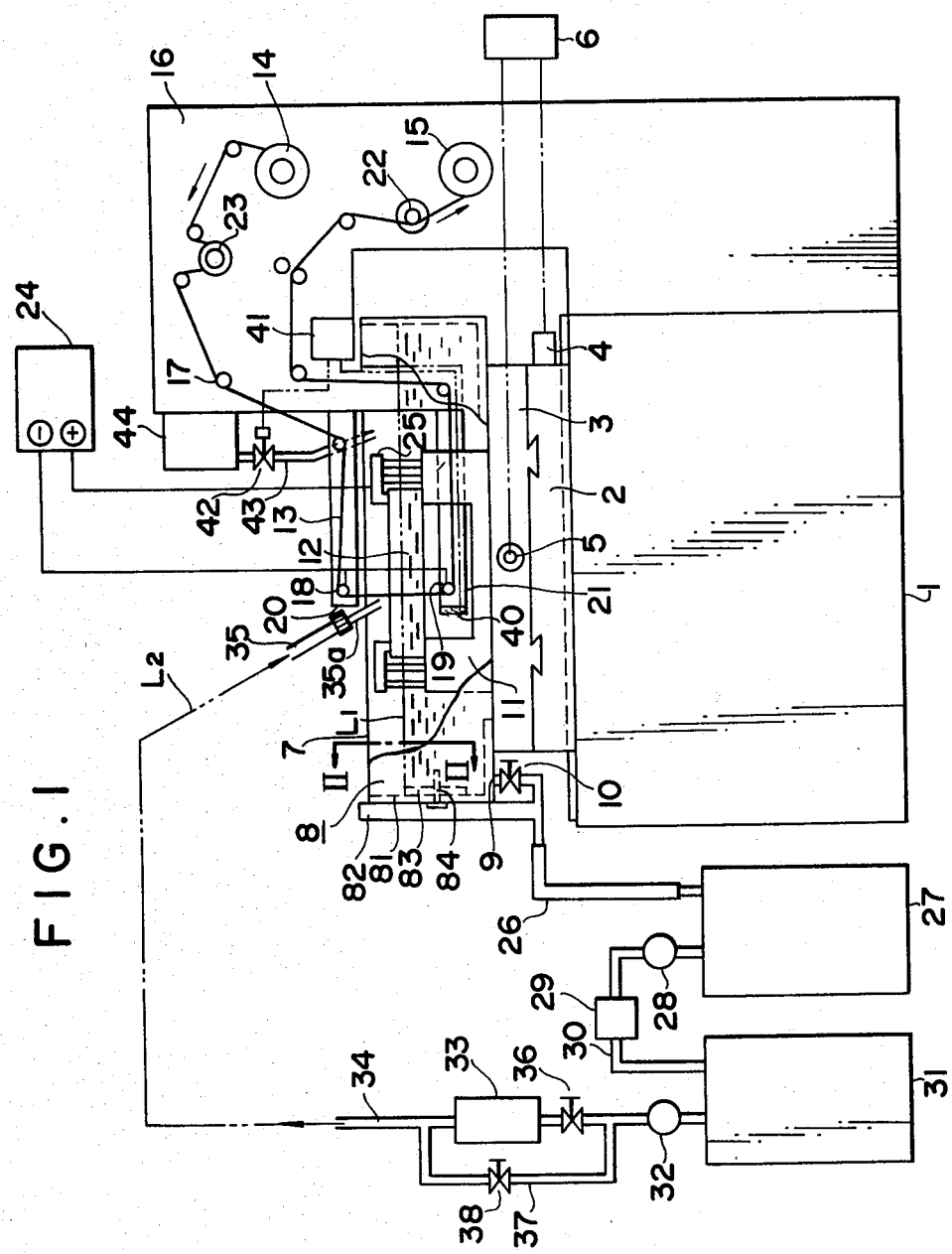
FIG. 1 is an elevational front view, partly in section, partly broken away and partly schematic, illustrating a wire-electroerosion apparatus embodying the present invention.

In FIG. 1 there is shown a wire-electroerosion machining apparatus including a bed 1 which carries a pair of drive tables 2 and 3 constructed in a cross-slide arrangement. The tables 2 and 3 are adapted to be horizontally displaced along an X-axis and a Y-axis by motors 4 and 5, respectively, which are driven in response to pulsed drive signals furnished from a numerical control (NC) unit 6. The latter has preprogrammed instructions stored therein and, in the operation of the apparatus, reproduced to produce sequences of drive pulses distributed to drive the X-axis and Y-axis motors 4 and 5 individually in the customary manner to displace a given point on the tables 2 and 3 along a preselected (cutting) path in the X-Y coordinate system.

Figure 2:
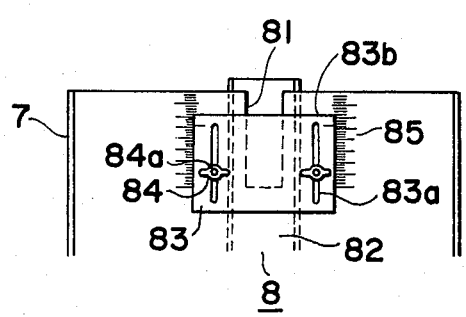
FIG. 2 is a side view, taken along the line II—II and viewed in the direction of arrows, of a portion of the apparatus of FIG. 1.

The table 3 has a worktank 7 securely mounted thereon which contains a first electroerosion-machining liquid L1 which is here a water-base liquid and whose surface level is adjusted by an arrangement 8 as more fully shown in FIG. 2. The arrangement 8 comprises a vertical indentation 81 cut in a side wall portion of the tank 7 to a suitable length from the top and covered from the exterior of the tank 7 with an elongate U-shaped fitting 82 attached on an outer wall portion of the tank 7. A rectangular plate 83 with a pair of parallel grooves 83a is arranged on the inner wall portion of the tank 7 adjustably with a pair of butterfly nuts 84 threadable with screws 84a which are secured to the tank 7 to guide through the grooves 83a, respectively. A pair of parallel vertical scales 85 equally graduated are marked on the inner wall of the tank 7 in both sides of the indentation 82 to allow adjustment of the top surface 83b of the plate 83 at a required level. Upon positioning the top surface 83b of the plate 83 with reference to the scale 85, the plate 83 is secured to the tank 7 by firmly threading the butterfly nuts 84 with the screws 84a in the grooves 84a, respectively. This arrangement allows any excess portion of the machining liquid L1 in the worktank 7 to flow over the top surface 83b of the plate 83 and to be collected through the fitting 82, thus establishing and maintaining the surface level of the liquid L1 in the worktank 7 at a required height. The worktank 7 is provided also at a floor portion thereof with a liquid outlet passage 9 which communicates with the fitting 82 via a valve 10. The valve 10 is opened to remove via the passage 9 the liquid from the worktank 7 at completion of a given machining operation.

Securely mounted on the floor of the worktank 7 is a work-mounting block or support 11 on which a workpiece 12 is in turn securely mounted. The workpiece 12 is shown in the form of a rectangular block with upper and lower surfaces situated in parallel with the horizontally extending surface level of the machining liquid L1. A continuous wire electrode 13 extends between a supply reel 14 and a takeup reel 15 both of which are mounted on a column 16 of the apparatus and is guided via a plurality of guide rollers 17 and a pair of machining guide member 18 and 19 in the path of its travel. The guide member 18 and 19 are provided on the free ends of a pair of parallel horizontally extending arms 20 and 21, respectively, both of which extend from the column 16. The guide members 18 and 19 are located to cause the wire electrode 13 to vertically pass through the workpiece 12 or to traverse the workpiece in a direction perpendicular to the upper and lower surfaces of the workpiece 12 and to the horizontal plane defined by the surfaces of the liquid L1 in the worktank 7. The wire electrode 13 is axially displaced in the direction of arrow by a traction drive 22 (driven by a motor) provided on the column 16 together with a braking drive 23 (driven by a motor) which gives the wire 13 a suitable tensin. The wire electrode 13 is axially displaced continuously at a rate of, say, 1 to 3 cm/sec. Typically, the wire electrode 13 has a diameter or thickness of 0.01 to 0.5 mm and is composed of copper or brass.

An electroerosion-machining power supply 24 has a pair of output terminals one of which (normally negative pole) is connected to the wire electrode 13 via the machining guides 18 and 19 and the other of which (normally positive pole) is connected to the workpiece 12 via a conducting block 25 which serves to securely hold the workpiece 12 to the mounting block 11. The power supply 24 supplies an electroerosion current, typically in the form of a succession of electrical pulses, between the wire electrode 13 and the workpiece 12 across a machining gap which extends across the entire thickness of the workpiece 12.

The water-base machining liquid L1 drained from the worktank 7 via the fitting 82 or via the outlet passage 9 and the valve 10 is carried by a fluexible hose 26 into a sump 27. A pump 28 draws the spent machining liquid collected in the sump 27 to feed it through a filter 29 and a conduit 30 into a reservoir 31. The filter 29 collects therein machining tar, chips and other particles from the spent liquid L1. The filtered liquid in the reservoir 31 is drawn by a pump 32 and thereby passed through an ion-exchanger cartridge 33 and then fed via a conduit 34 to a delivery nozzle unit 35. The function of the ion-exchanger 33 is to deionize the water liquid L1 from the reservoir 31 to produce a purified water liquid which, having a specific resistivity greater by one order or more than that of the first electroerosion-machining liquid L1, here constitutes a second electroerosion-machining liquid L2. The ion-exchange cartridge 33 is connected with the pump 32 via a valve 36, and the latter and the cartridge 33 are bypassed by a conduit 37 including a valve 38.

Figure 3:
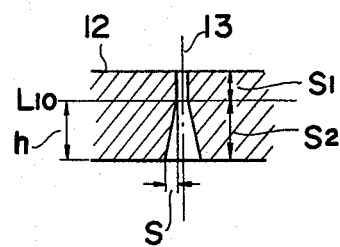
FIG. 3 is a schematic sectional view illustrating a workpiece being machined with a wire electrode according to the invention.

In the worktank 7, the workpiece 12 is, as shown, partially immersed in the first electroerosion-machining liquid L1 to a preselected height h from the lower surface thereof so that the surface level L10 of the liquid L1 divides the workpiece 12 into a non-immersed section S1 and an immersed section S2 as shown in FIG. 3. The sections S1 and S2 represent the portion of the workpiece 12 to be machined straight or without tapering and the portion of the workpiece 12 to be taper-machined, respectively.

The worktank 7 is supplied with the lower-resistivity machining liquid L1 by closing the valves 10 and 36 and opening the valve 38 and then actuating the pump 32. This allows the liquid L1 in the reservoir 31 to be drawn through the conduit 34 and the nozzle unit 35 into the worktank 7 directly or via the conduit 37. In the worktank 7, the liquid L1 rises its surface level until it reaches the preselected level L10 which, as mentioned previously, is established and maintained by the level adjuster 8 to define the desired sections S1 and S2.

In machining operation, the valve 38 is closed and the valve 36 is open while the valve 10 is held closed. The higher-resistivity machining liquid L2 now issues from the narrow opening 35a of the nozzle unit 35 and is delivered in a stream first into the region of the machining gap along the upper section S1 above the liquid level L10 and then allowed to diffuse into the machining gap along the lower section S1 flooded with the lower-resistivity machining liquid L1.

It has been found that electroerosive material removal from the workpiece 12 then occurs uniformly along the portion S1 and more quickly there than along the portion S2 and further that the rater of electroerosive material removal in the portion S2 increases as the distance from the level L10 is increased. As a consequence, the section S1 develops a uniform clearance and the section S2 develops the clearance which diverges or inversely tapers towards the lower surface of the workpiece 12. This is illustrated in FIG. 3. The varying rate of material removal and the development of tapered clearance indicate that both electrical discharge and electrochemical actions are taking place in some unique manner.

As material removal proceeds in this manner, the workpiece 12 is displaced in a horizontal plane with the drive tables 2 and 3 relative to the vertical axis of the axially traveling wire electrode 13 which is fixedly held. As mentioned previously, this displacement is effected on the basis of data preprogrammed in the NC unit 6, thus to follow a preselected path which determines the shape of a desired machining contour on the upper surface of the workpiece 12. It will be appreciated that the contour which is uniformly straight or non-tapered across the thickness S1 and uniformly tapered across the thickness S2 is generated in the workpiece 12. The wire-electrode 13 should preferably be displaced from up to down.

The apparatus is also shown provided with a resistivity detector 40 disposed immediately below the workpiece 12 for monitoring an increase in the specific resistivity of the lower-resistivity liquid L1 in the worktank 7, which increase will occur as the proportion of the higher-resistivity liquid L2 furnished by the nozzle unit 35 increases. The output signal of the detector 40 is applied to a controller 41 which acts on an electromagnetic valve 42 provided in a conduit 43 that communicates an aqueous-electrolyte receptacle 44 with the worktank 7. Thus, when the detector 40 senses a deviation from a preselected value of the specific resistivity of the liquid L1 in its region, the controller 41 develops an electrical control signal and thereby opens the valve 42 to allow the aqueous electrolyte—of a resistivity much lower than that of the liquid L1—in the receptacle 44 to be supplied into the worktank 7. The supply continues until the detector 40 senses the resistivity returning to the predetermined value. In this manner, the resistivity of the liquid L1 in the worktank 7 is automatically held to be substantially constant.

EXAMPLE

With an apparatus as described in FIG. 1, a rectangular steel workpiece of 50 mm thick is machined using the lower-resistivity liquid a water liquid having a specific resistivity of $5 \times 10^4$ ohm-cm and as the higher-resistivity liquid a water liquid having a specific resistivity of $2.5 \times 10^5$ ohm-cm. The workpiece is partially immersed in the lower-resistivity liquid by setting and maintaining its surface level positioned at 35 mm from the lower surface of the workpiece. The wire-electrode is a hard copper wire of 0.2 mm diameter and is axially displaced from up to down continuously at a rate of travel of 1 m/min. The higher-resistivity liquid is supplied from a nozzle disposed above the workpiece into the machining gap on the upper workpiece surface and an electroerosion machining current is supplied between the wire electrode and the workpiece. When the workpiece is displaced in the horizontal plane relative to the axis of the traveling wire electrode at a rate of displacement of 1 mm/min, the upper section of the workpiece deep to 15 mm from the upper surface is uniformly machined to form a straight or non-tapered cut edge whereas the lower section is machined to form a downwardly diverged or tapered cut edge as depicted in FIG. 3. The clearance at the lower workpiece surface is greater by 0.012 mm than the clearance at the upper workpiece surface. When the lower-resistivity liquid is replaced by a water liquid of $1 \times 10^4$ ohm-cm, the differencer in clearance is increased to 0.04 mm.

It will be appreciated that a useful tapering is achieved with the extremely simplified arrangement and is obtainable in an extremely shortened time because only a single step operation is required to provide a pair of stepped non-tapered and tapered sections in the workpiece.

In a modified arrangement shown in FIG. 4 in which the same reference numerals as those in FIG. 1 refer to essentially same components, the workpiece 12 is tightly retained with a receptacle 50 open both up and below and shaped to fittedly surround it. The receptacle 50 is formed through a wall portion thereof with an opening 51 which communicates via a conduit 52 with a liquid return pipe 53. The latter is connected via a valve 54 directly to the reservoir 31. The fitting 82 is connected via a valve 55 to the sump 27 whereas the outlet 9 is connected via the valve 10 and a further valve 56 to the sump 27. As in the previous arrangement, the sump 27 is connected via the pump 28 and the filter 29 to the reservoir 31.

As in the previous embodiment, the workpiece 12 is partially immersed in the lower-resistivity machining liquid L1 so that the surface level L10 of the liquid L1 positioned at a predetermined height h (FIG. 3) form the lower surface of the workpiece 12. In this arrangement, it will be appreciated that the receptacle 50 serves to separate the high-resistivity-liquid L2 supplied from the nozzle unit 35 onto the upper surface of the workpiece 12 from the lower-resistivity liquid L1 in the worktank 7 except in the region of the machining gap which extends across the thickness of the workpiece 12 in the region of the traveling wire electrode 13. Thus only the portion of the high-resistivity machining liquid L2 which passes through the upper section S1 and then into and out of the lower section S2 (FIG. 3) is allowed to mix with the lower-resistivity machining liquid L1 received in the worktank 7. The entire other portion of the high-resistivity liquid L2 overflows the workpiece 12 and is collected through the opening 51 and the pipe 54 into the reservoir 31 for recycling.

It will thus been seen that there is provided by the present invention a novel and improved method of and apparatus for the wire-electroerosion machining of a tapered contour in a workpiece.

What is claimed is:

1. A wire-electroerosion method of forming a workpiece with a contour having a non-tapered and tapered portions stepped in the direction of thickness of the workpiece, the method comprising the steps of:
   disposing the workpiece in a worktank containing a first electroerosion-machining liquid so that said workpiece is partially immersed therein to a preselected height from the lower surface of the workpiece with the liquid surface level extending in a horizontal plane dividing said workpiece into a non-immersed upper portion and an immersed lower portion;
   passing a continuous wire electrode vertically through said workpiece to define an elongate machining gap extending across said non-immersed upper and immersed lower portions, and axially displacing said wire electrode from a supply means to a collection means through said machining gap;
   supplying from above said workpiece, a stream of a second electroerosion-machining liquid having a specific resistivity greater than that of said first liquid into said machining gap in said non-immersed upper portion and permitting said stream at least partially to diffuse into said machining gap in said immersed lower portion of the workpiece while applying a machining electric current between said wire electrode and said workpiece whereby electroerosive material removal from said workpiece occurs across said machining gap along said upper portion uniformly at a first rate and along said lower portion at a second rate which is not less than said first rate and which increases as the distance from said horizontal plane is increased;
   maintaining said surface level of the liquid in said worktank substantially constant;
   maintaining the specific resistivity of the liquid in said worktank substantially constant; and
   relatively displacing said wire electrode and said workpiece orthogonally to the axis of said wire electrode along a predetermined path.

2. The method defined in claim 1 wherein said wire electrode is axially displaced from above to below said workpiece.

3. The method defined in claim 2 wherein said first and second electroerosion-machining liquids are water-base liquids varying in specific resistivity in term of ohm-cm at least by one order.

4. The method defined in claim 1 wherein said wire electrode is poled negative and said workpiece is poled positive.

5. A wire-electroerosion apparatus for forming a workpiece with a contour having a non-tapered and tapered portions stepped in the direction of thickness of the workpiece, the apparatus comprising:
   a worktank for containing a first electroerosion-machining liquid and receiving the workpiece therein in such a manner that it is partially immersed in said liquid to a preselected height from the lower surface of the workpiece with the liquid surface level extending in a horizontal plane dividing the workpiece into a non-immersed portion and an immersed portion;
   means for guiding a continuous wire electrode to pass vertically through said workpiece, thereby defining an elongate machining gap therebetween extending across said non-immersed upper and immersed lower portions;
   means for axially displacing said wire electrode from a supply means to a collection means through said machining gap;
   nozzle means disposed above said workpiece for supplying a stream of a second electroerosion-machining liquid having a specific resistivity greater than that of said first liquid into said machining gap in said non-immersed portion and permitting said stream at least partially to diffuse into said machining gap in said immersed portion of the workpiece;
   power supply for applying a machining electric current between the wire electrode and said workpiece to produce electroerosive material removal from the workpiece across said elongate machining gap whereby the material removal occurs along said upper portion uniformly at a first rate and along said lower portion at a second rate which is not less than said first rate and increases as the distance from said horizontal plane is increased;
   means for maintaining said surface level of the liquid in said worktank substantially constant;
   means for the maintaining specific resistivity of the liquid in said worktank substantially constant; and
   machining feed drive means for relatively displacing said wire electrode and said workpiece orthogonally to the axis of said wire electrode along a predetermined path.

* * * * *

UNITED STATES PATENT AND TRADEMARK OFFICE
CERTIFICATE OF CORRECTION

PATENT NO. : 4 367 129

DATED : 4 January 1983

INVENTOR(S) : Kiyoshi Inoue

It is certified that error appears in the above-identified patent and that said Letters Patent is hereby corrected as shown below:

In the heading, in the left column, please insert item [30] as follows:

-- Foreign Application Priority Data: 16 June 1980, JAPAN, No. 55-81756 --

Signed and Sealed this

Seventh Day of February 1984

[SEAL]

Attest:

GERALD J. MOSSINGHOFF

Attesting Officer

Commissioner of Patents and Trademarks